(12) United States Patent
LaMastres et al.

(10) Patent No.: US 7,281,263 B1
(45) Date of Patent: Oct. 9, 2007

(54) SYSTEM AND METHOD FOR MANAGING SECURITY ACCESS FOR USERS TO NETWORK SYSTEMS

(75) Inventors: Daniel G. LaMastres, Independence, MO (US); John Michael Everson, Kansas City, MO (US); James W. Norris, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1309 days.

(21) Appl. No.: 09/792,322

(22) Filed: Feb. 23, 2001

(51) Int. Cl.
*H04L 9/32* (2006.01)
*G06F 15/16* (2006.01)
*G06F 15/167* (2006.01)
*G06F 15/173* (2006.01)

(52) U.S. Cl. .................. 726/2; 726/4; 726/26; 709/201; 709/213; 709/217; 709/224; 709/230; 709/249

(58) Field of Classification Search ......... 713/200–202
See application file for complete search history.

(56) References Cited

U.S. PATENT DOCUMENTS

| | | | | |
|---|---|---|---|---|
| 5,604,487 | A * | 2/1997 | Frymier | 340/5.9 |
| 5,623,637 | A * | 4/1997 | Jones et al. | 711/164 |
| 5,661,781 | A * | 8/1997 | DeJager | 379/144.07 |
| 5,768,382 | A * | 6/1998 | Schneier et al. | 380/251 |
| 5,815,665 | A * | 9/1998 | Teper et al. | 709/229 |
| 5,842,043 | A * | 11/1998 | Nishimura | 710/36 |
| 6,128,472 | A * | 10/2000 | Harel et al. | 340/7.21 |
| 6,236,996 | B1 * | 5/2001 | Bapat et al. | 707/9 |
| 6,275,936 | B1 * | 8/2001 | Kyojima et al. | 713/182 |
| 6,275,941 | B1 * | 8/2001 | Saito et al. | 726/2 |
| 6,370,139 | B2 * | 4/2002 | Redmond | 370/354 |
| 6,418,466 | B1 * | 7/2002 | Bertram et al. | 709/221 |
| 6,442,515 | B1 * | 8/2002 | Varma et al. | 703/22 |
| 6,453,353 | B1 * | 9/2002 | Win et al. | 709/229 |
| 6,584,454 | B1 * | 6/2003 | Hummel et al. | 705/59 |
| 6,655,587 | B2 * | 12/2003 | Andrews et al. | 235/383 |
| 6,662,228 | B1 * | 12/2003 | Limsico | 709/225 |
| 6,735,701 | B1 * | 5/2004 | Jacobson | 726/1 |

(Continued)

FOREIGN PATENT DOCUMENTS

EP 1480405 A1 * 11/2004

OTHER PUBLICATIONS

Tobagi, Fouad, Carrier Sense Multiple Access with Message-Based Priority Functions, 1982, IEEE, pp. 185-200.*
Turner, Lee, Rules for Messaging, 1995, Network World, pp. 65, 66 and 68.*
Burns et al, Semi-Preemptible Locks for a Distributed File System, 2000, IEEE, pp. 397-404.*
Judge et al, Gothic: A Group Access Control Architecture for Secure Multicast and Anycast, 2002, IEEE, pp. 1547-1556.*

*Primary Examiner*—Ayaz Sheikh
*Assistant Examiner*—Aravind K Moorthy

(57) ABSTRACT

A network security system for managing access to a plurality of different network systems for a plurality of users. The network security system includes an enterprise directory system configured to process request messages from each of the network systems requesting access rights for a user to generate a response message for each of the network systems that includes the access rights for the user. The enterprise directory system is also configured to process a single termination message to generate an individual termination message for each of the network systems that includes an instruction to terminate the access rights for one of the users. The resource directory is configured to receive an instruction to terminate the access rights for the corresponding user and process the instruction to generate the termination message for the enterprise directory system.

64 Claims, 5 Drawing Sheets

U.S. PATENT DOCUMENTS

| | | | |
|---|---|---|---|
| 6,754,658 B1 * | 6/2004 | Matsuno | 707/9 |
| 7,058,971 B1 * | 6/2006 | Horikiri | 726/7 |
| 7,200,860 B2 * | 4/2007 | Ghaffar | 726/2 |
| 2001/0011253 A1 * | 8/2001 | Coley et al. | 705/59 |

* cited by examiner

SYSTEM AND METHOD FOR MANAGING SECURITY ACCESS FOR USERS TO NETWORK SYSTEMS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to network security systems, and specifically, to a network security system that provides centralized access and termination control to a plurality of different network systems for a plurality of network users.

2. Description of the Prior Art

It is problem in the art of network security to provide and manage access to a plurality of different network systems for a plurality of users with different levels of access rights. One solution to this problem is to utilize network access cards, sometimes referred to in the art as "smart cards," to provide users with the appropriate access to the different network systems according to the level of the user's access rights. A network access card system connected to the network provides customized network access cards to the individual users. The network access cards then serve as keys for the individual users to access the various systems according to the user's access rights.

In one example of a system that utilizes network access cards, the network access card system interfaces with a human resource system to obtain an individual users access information. In response to receiving the access information from the human resource system, the network access card system customizes a network access card for the user that includes access rights to the different network systems according to the user's level of access. A profile for the user that includes the user's access information is setup on each of the individual network systems for which the user is granted access. For example, the user profile could be setup for various devices in a physical security system to provide building access, office access, lab access, conference room access etc. The user profile could also be setup on the user's workstation and/or other devices connected to the network to provide the user with access to those devices. The network access card then serves as key to permit the user to access the various systems and data.

Unfortunately, when access rights for a user change, or are terminated all together, each of the individual network systems must be manually updated to delete the user profile information to terminate the user's access. Where the user has access to dozens of network systems, the process of removing the user's access to all of these systems often takes weeks or even months. This problem is further complicated where there are hundreds or even thousands of users with different levels of access to a plurality of different network systems.

SUMMARY OF THE INVENTION

The present invention advances the art by providing a network security system that provides centralized access and termination control to a plurality of different network systems for a plurality of network users. The network security system comprises an enterprise directory system, a resource directory system, and a network access card system. The resource directory system is configured to receive user profile information for each of the plurality of network users. The network access card system is configured to interface with the resource directory system to obtain the individual users profile information and configure a network access card with the access information for the different network systems. The enterprise directory system is configured to receive the user profile information from the resource directory system and generate a user record that includes the user's access rights to the different network systems to provide the centralized access and termination management.

As the individual users access the individual network systems using the network access card, the network systems generate request messages for the enterprise directory system. The request messages include a request for the user's access rights to the requesting one of the individual network systems. The enterprise directory system processes the individual request messages to generate individual response messages that include the user's access rights for the requesting network system. If access to the requesting network system is granted, the network system processes the response message to grant the user access to the network system. If access is denied, the network system processes the response message to deny access to the user. In some examples of the present invention, the individual network systems could generate a request message each time a user accesses the network system. In other examples of the present invention, the network systems could process the response message granting access to the system to create a user profile. The user profile permits the user to access to the network system using the network access card without the need to generate additional request messages for the enterprise directory system.

If a user's access rights are terminated, the condition is indicated in the resource directory system. The resource directory system processes the termination indication to generate a termination message for the enterprise directory system that includes an instruction to terminate the access rights for the respective user. The enterprise directory system processes the termination message to automatically generate an individual termination message for each of the different network systems to which the respective user has access. The individual termination messages include an instruction to terminate the user's access to the different network systems or to a specific portion of the network system, such as, an access point, software application, or database. If a user's access rights change, the condition is indicated in the resource directory system, which automatically generates an update message for the enterprise directory system. The enterprise directory system processes the update message to automatically generate a termination message for any network system where the user's access is terminated. Where access to additional network systems is granted in the update message, the enterprise directory system grants access to the additional network systems upon receiving the request for access rights from the respective system in response to a request for access to that system from the user.

A first advantage of the present network security system is the centralized management of access rights by the enterprise directory system to a large number of different network systems for a large number of users. A second advantage of the present network security system is that it automates user access to the different network systems using a single access card or access token. Thus, rather than having multiple accounts and passwords for many different systems that must be set up by a system administrator for each system, and consequently having to remember or record those passwords, users are provided with access to the various network systems using a single access card. A third advantage of the present network security system is that it provides seamless integration and expansion for the addition of future network system applications and users. A fourth advantage of the present network security system is that a user's access to all or some of the network systems is terminated by a single indication in the resource directory system. The difficulty in manually setting up and removing an employees access rights, such as passwords and id numbers, for a large number of network systems can be appreciated by one skilled in the art. A fifth advantage of the present network security system is that the access can be granted to an entire network system or just to specific applications or areas of the network system as a matter of design choice. For example a first user may have access to a first set of software on one of the network systems and a second user may have access to a second set of software on the same network system. Similarly, a first user may have access to a first set of areas within a physical security system, e.g. a building security system, and a second user may have access to a second set of areas within the physical security system.

In the context of the present invention, the first, second, third, fourth, etc. connotations used to reference the messages and systems are used for the purpose of differentiating between different messages and systems and are not used to indicate a system sequence or processing sequence.

DETAILED DESCRIPTION OF THE PREFERRED EMBODIMENT

Figure 1:
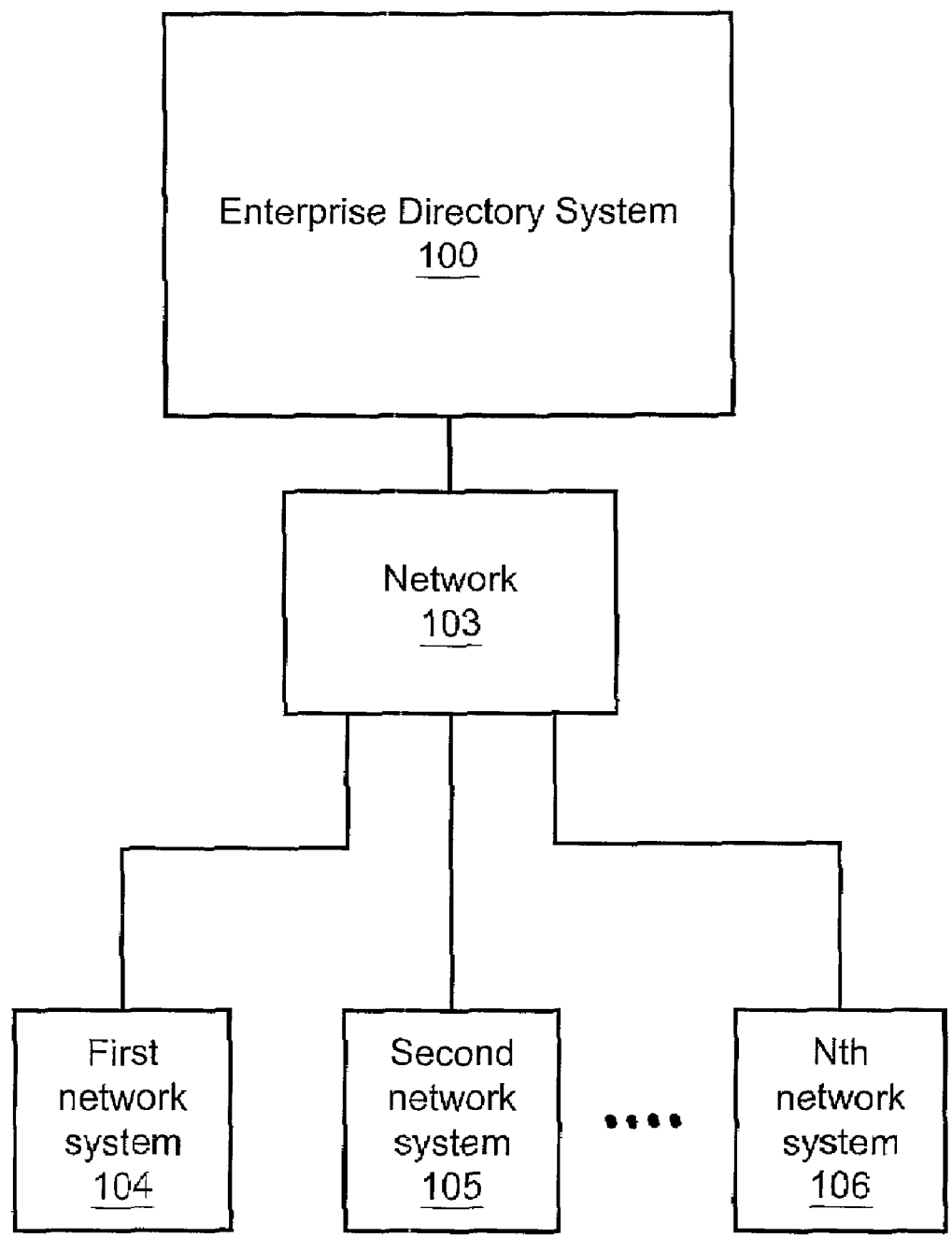
FIG. 1 illustrates an example of an enterprise directory system according to the present invention.

Enterprise Directory System FIG. 1:

FIG. 1 depicts an enterprise directory system 100, a network 103, a first network system 104, second network system 105, and Nth network system 106. The network 103 is connected to the enterprise directory system 100 and the network system 104, the network system 105, and the network system 106. Those skilled in the art will appreciate that numerous other network systems could be connected to the network 103 although only network systems 104-106 are depicted on FIG. 1 for clarity.

The network 103 could be one or more networks that connect the network systems 104-106. For example, the network 103 could comprise a Local Area Network ("LAN") or a Wide Area Network "(WAN") or a LAN connected to a WAN. The network 103 could also be interconnected with other WANs by a data network, such as an IP, Frame Relay or ATM network. In another example of the present invention, the network 103 could be connected to other wireline or wireless networks. For example, the network 103 could be connected to the public switched telephone network, an asynchronous transfer mode ("ATM") network, Internet Protocol ("IP") network or a personal communication service ("PCS") network. Those skilled in the art will appreciate that the network 103 would include various conventional components not shown on FIG. 1 for clarity.

The network system 104 could by any device or group of devices configured to receive access information from individual users, and process the access information to generate a request message for the enterprise directory system 100 that includes a request for access rights to the network system 104 for the requesting user. The network system 104 also processes a response message from the enterprise directory system 100 that includes the access rights for the requesting user and grants or denies access to the network system 104 according the access rights provided by the enterprise directory system 100. The network system 105 could be any device or group of devices configured to receive access information from individual users, and process the access information to generate a request message for the enterprise directory system 100 that includes a request for access rights to the network system 105 for the requesting user. The network system 105 also processes a response message from the enterprise directory system 100 that includes the access rights for the requesting user and grants or denies access to the network system 105 according the access rights provided by the enterprise directory system 100. The network system 106 could by any device or group of devices configured to receive access information from individual users, and process the access information to generate a request message for the enterprise directory system 100 that includes a request for access rights to the network system 106 for the requesting user. The network system 106 also processes a response message from the enterprise directory system 100 that includes the access rights for the requesting user and grants or denies access to the network system 106 according the access rights provided by the enterprise directory system 100.

The access information could be any information that identifies a requesting user to the enterprise directory system 100. Those skilled in the art will appreciate that the user could provide the access information to the individual network systems 104-106 in a variety of ways. For example, the access information could be provided by a physical token in possession of the user, such as an access card. The access card could be read by the individual network system 104-106 using a card reader. The card reader could be a conventional device and could receive the access information from the access card via a magnetic strip, a bar code or processing circuitry, such as a computer chip, included in the access card. In another example of the present invention, the access information could be provided to the individual network system 104-106 in a combination of formats. For example, a portion of the access information could be received from an access card and a portion of the access information could be received directly from the user, such as by entry of a user identification number ("ID"), password, or biometric scan that validates the cardholder or the access card. Some examples of the access information include without limitation, a password, a user ID, biometric technology such as finger print or eye retina scan.

The enterprise directory system 100 is configured to provide a single point of control for managing access to the plurality of different network systems 104-106 for a plurality of users. Thus, the enterprise directory system could receive a request for access from the network system 104, in response to a user request for access to the network system 104, and processes the request to indicate to the network system 104 the requesting user's access rights to the network system 104. The enterprise directory system 100 could also receive a request for access from the network system 105, in response to a user request for access to the network system 105, and processes the request to indicate to the network system 105 the requesting user's access rights to the network system 105. The enterprise directory system 100 could also receive a request for access from the network system 106, in response to a user request for access to the network system 106, and processes the request to indicate to the network system 106 the requesting user's access rights to the network system 106.

The enterprise directory system 100 also manages termination of access rights to the plurality of different network systems 104-106 for the plurality of users. Thus, the enterprise directory system 100 could receive a single termination message and process the termination message to generate individual termination messages for the network systems 104-106 that terminate a users access to the network systems 104-106. The enterprise directory system 100 also manages changes to a user's access rights. Thus, the enterprise directory system 100 could also receive an update message and process the update message to generate an individual termination message for only some of the network systems 104-106 according to new access rights in the update message. Similarly, the enterprise directory system 100 could also grant access to another one of the network systems, 104-106, where the user was not previously permitted access, according to new access rights in the update message.

Figure 2:
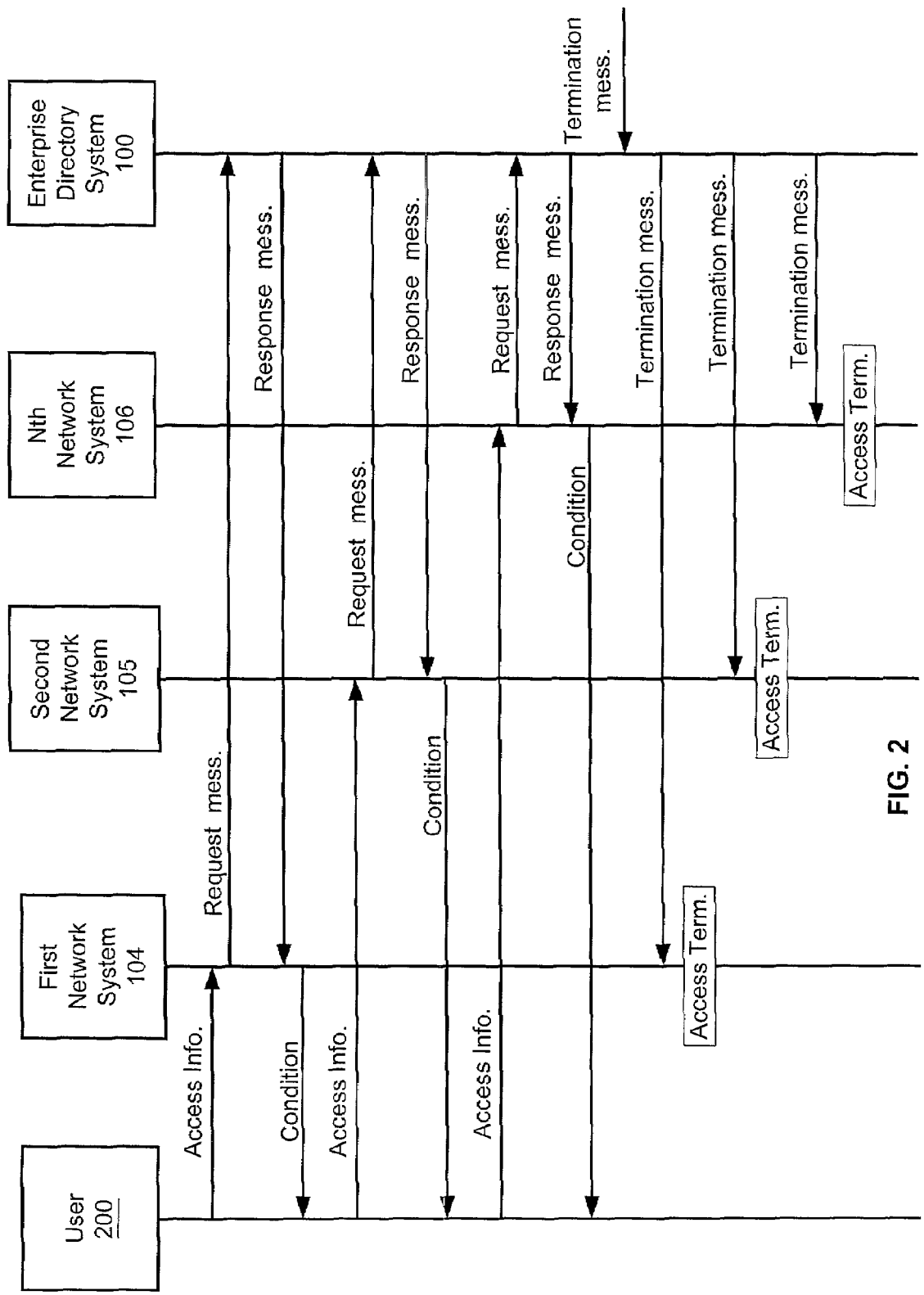
FIG. 2 is a message sequence chart illustrating an example of the operation of an enterprise directory system according to the present invention.

Enterprise Directory System Operation FIG. 2:

FIG. 2 is a message sequence chart illustrating some examples of the operation of the enterprise directory system 100 according to the present invention. It is anticipated however, that one skilled in the art will recognize numerous other examples in accordance with the principles described below, and thus, the following examples are for the purpose of illustration and not limitation. Those skilled in the art will also appreciate that various features described below could be combined with the above described embodiment to form multiple variations of the invention.

On FIG. 2 the operation begins when a user 200 desires access to the network system 104 and provides the access information to the network system 104. It should be noted that there is no significance to the order of network systems that the user 200 accesses. Thus, the operation would be the same regardless of whether the first network system accessed by the user 200 was the network system 104, the network system 105 or the network system 106. In response to receiving the access information, the network system 104 generates a request message for the enterprise directory system 100 that includes a request for access rights to the network system 104 for the user 200. In response to receiving the request message, the enterprise directory system 100 processes the request message to generate a response message for the network system 104. The response message includes the access rights for the user 200 to the network system 104. In response to receiving the response message, the network system 104 processes the response message to grant or deny access to the network system 104 according to the access rights provided by the enterprise directory system 100 for the user 200. In response to granting or denying access to the user 200, the network system 104 indicates the access condition to the user 200. Those skilled in the art will appreciate that the condition could be indicated by a variety of methods as a matter of design choice and type of network system. For example, where the network system 104 is a workstation, the condition could be indicated by a text message or by providing the access to the user 200. In another example, where the network system 104 is a building access, the condition could be indicated by a sound, a text message, or the automatic opening of a door.

In another example where the user 200 desires access to the network system 105, the user 200 provides the access information to the network system 105. In response to receiving the access information, the network system 105 generates a request message for the enterprise directory system 100 that includes a request for access rights to the network system 105 for the user 200. In response to receiving the request message, the enterprise directory system 100 processes the request message to generate a response message for the network system 105. The response message includes the access rights for the user 200 to the network system 105. In response to receiving the response message, the second network system 105 processes the response message to grant or deny access to the network system 105 according to the access rights provided by the enterprise directory system 100 for the user 200. In response to granting or denying access to the user 200, the network system 105 indicates the access condition to the user 200. As with the above example, the condition could be indicated by a variety of methods as a matter of design choice and type of network system.

In another example where the user 200 desires access to the network system 106, the user 200 provides the access information to the network system 106. In response to receiving the access information, the network system 106 generates a request message for the enterprise directory system 100 that includes a request for access rights to the network system 106 for the user 200. In response to receiving the request message, the enterprise directory system 100 processes the request message to generate a response message for the network system 106. The response message includes the access rights for the user 200 to the network system 106. In response to receiving the response message, the network system 106 processes the response message to grant or deny access to the network system 106 according to the access rights provided by the enterprise directory system 100 for the user 200. In response to granting or denying access to the user 200, the network system 106 indicates the access condition to the user 200. As with the above examples, the condition could be indicated by a variety of methods as a matter of design choice and type of network system.

In another example where the user 200 loses all access rights to the network systems 104-106, such as where the user 200 is terminated as an employee, the operation begins when the enterprise directory system 100 receives a termination message that includes the change in access rights for the user 200. The termination message could be received from another system in the network 103, from a system administrator, or other source. In response to receiving the termination message, the enterprise directory system 100 processes the termination message to generate an individual termination message for the network system 104, the network system 105, and the network system 106. In response to receiving the individual termination message from the enterprise directory system 100, the network system 104, processes the termination message to terminate access to the network system 104 for the user 200. In response to receiving the termination message from the enterprise directory system 100, the network system 105, processes the termination message to terminate access to the network system 105 for the user 200. In response to receiving the termination message from the enterprise directory system 100, the network system 106, processes the termination message to terminate access to the network system 106 for the user 200.

Figure 3:
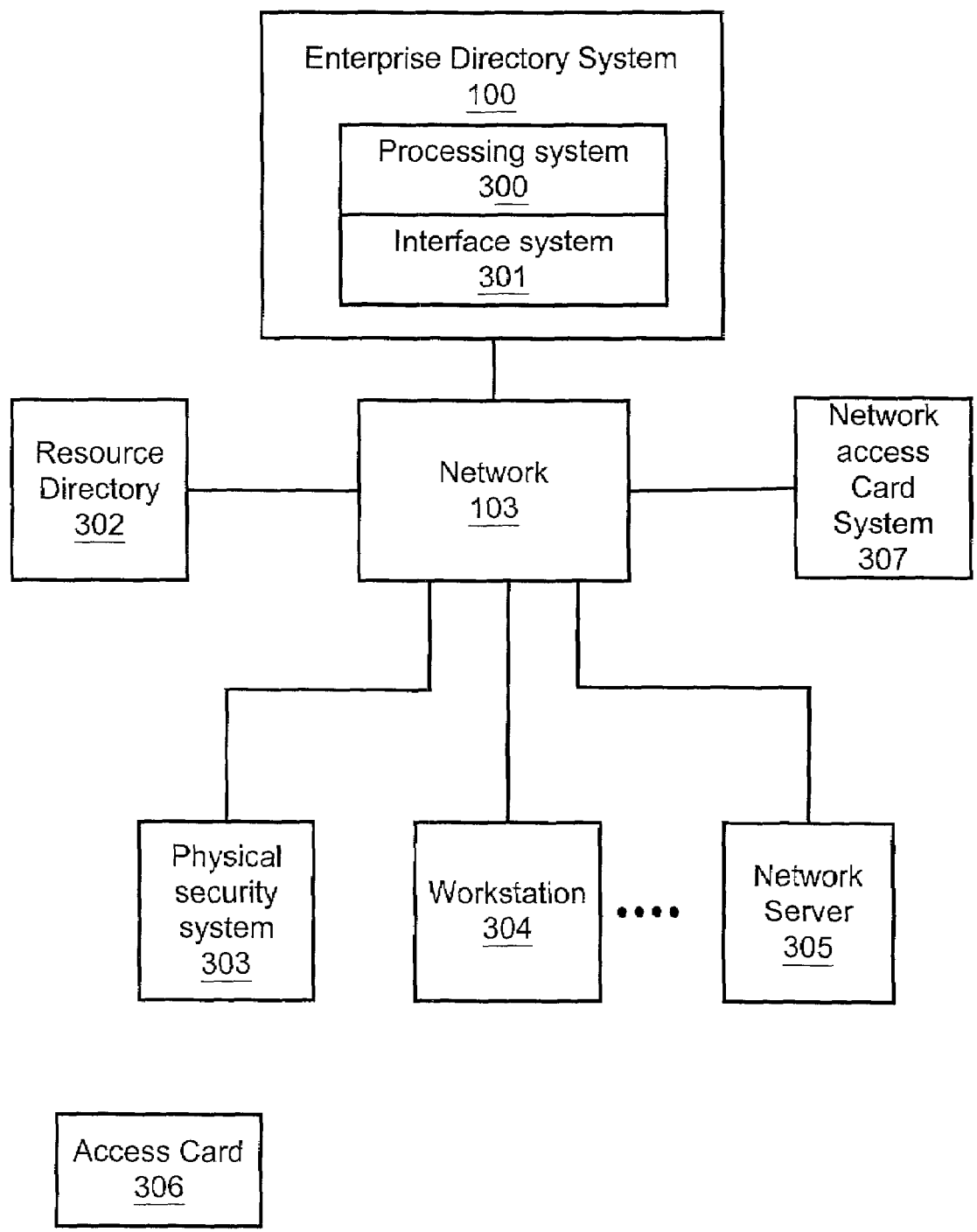
FIG. 3 is an example of a system architecture for a network security system according to the present invention.

Network Security System FIG. 3:

FIG. 3 depicts the enterprise directory system 100, the network 103, a resource directory 302, an access card system 307, a physical security system 303, a workstation 304, a network server 305 and an access card 306. Those skilled in the art will also appreciate that various features described below could be combined with the above described embodiment to form multiple variations of the invention.

The enterprise directory system 100 comprises a processing system 300 and an interface system 301. The network 103 is connected to the interface system 301, the resource directory 302, the physical security system 303, the workstation 304, the access card system 307, and the network server 305.

The resource directory 302 could be any directory configured to receive user profile information for new users and receive user profile update information for existing users. The user profile update information could include an instruction to terminate a users access to all of the network systems. In response to receiving user profile information for new users, the resource directory 302 could process the new user profile information to generate an update message for the enterprise directory system 100 that includes the new user profile information. In response to receiving user profile update information for existing users, the resource directory 302 could process the update information to generate an update message for the enterprise directory system 100 that includes the updated profile information for the existing user. The resource directory 302 could also receive an indication that a user's access rights to the network systems, e.g. the physical security system 303, the workstation 304, and the network server 305, are terminated. In response to the termination indication, the resource directory 302 could provide a termination message to the enterprise directory system 100 that includes an instruction to terminate the user's access rights to the network systems, e.g. the physical security system 303, the workstation 304, and the network server 305.

The processing system 300 could be any processor or group of processors configured to process a request message from the physical security system 303, a request message from the workstation 304 and a request message from the network server 305 to generate a response message for the physical security system 303, a response message for the workstation 304 and a response message for the network server 305. The response message for the physical security system 303 includes access rights to the physical security system 303 for a user. The response message for the workstation 304 includes access rights to the workstation 304 for either the user or another user. The response message for the network server 305 includes access rights to the network server 305 for either the user or another user. The processing system 300 is also configured to receive the termination message from the resource directory 302 and process the termination message to generate an individual termination message for the physical security system 303, the workstation 304 and the network server 305. The termination message for the physical security system 303 includes an instruction to terminate the user's access rights to the physical security system 303. In another example of the present invention, the termination message could terminate the user's access rights to only specific areas or access points within the physical security system 303. The termination message for the workstation 304 includes an instruction to terminate the user's access rights to the workstation 304. In another example of the present invention, the termination message could terminate the user's access rights to only specific programs, software or databases on the workstation 304. The termination message for the network server 305 includes an instruction to terminate the user's access rights to the network server 305. In another example of the present invention, the termination message could terminate the user's access rights to only specific programs, software or databases on the network server 305.

The processing system 300 could also receive the update messages from the resource directory 302. The update messages could include information on a new user who is provided access to some or all of the physical security system 303, the workstation 304 and the network server 305. The update messages could also include changes to an existing user's access rights to permit access to additional systems or deny access to systems currently accessed by the user. Where the update message provides new user information, the processing system 300 could process the update message to generate a record for the new user that includes the new user's access rights to the plurality of network systems, e.g. the physical security system 303, the workstation 304, and the network server 305. Where the update message provides changes to an existing user's access rights, the processing system 300 could process the update message to update the existing user's record to indicate the changes to the user's access rights. Where the user is now denied access to a network system, e.g. the network server 305, that user was previously granted access, the processing system could automatically generate a termination message for the network server 305 terminating the user's access to the network server 305. Where the user is now granted access to a network system, e.g. the network server 305, that user was previously not granted access, the processing system could grant access to the network server 305 in response to a request for access rights from the network server 305. It should be noted that the request for access rights is triggered by the user's request for access to the network server 305.

The interface system 301 could be any device or group of devices configured to receive the request messages from the physical security system 303, the workstation 304, and the network server 305, and receive the termination and update messages from the resource directory 302 for the processing system 300. The interface system 301 is also configured to transmit the response messages to the physical security system 303, the workstation 304 the network server 305 and transmit the termination messages to the physical security system 303, the workstation 304 and the network server 305 for the processing system 300. Although they are not shown for clarity, the interface system 301 could handle numerous links to other elements in the network 103. The interface system 301 could exchange messages with the network 103 and the physical security system 303, the workstation 304, and the network server 305 in various different protocols as a matter of design choice. For example the interface system 301 could exchange messages using the Lightweight Directory Access Protocol (LDAP). Those skilled in the art will appreciate that the processing system 300 and the interface system 301 could include other conventional components not shown on FIG. 3 for clarity.

The access card 306 could be any card that includes machine readable access information that permits a cardholder to access some or all of the physical security system 303, the workstation 304, and the network server 305. The machine readable access information could be any information that electronically represents the user for authentication and access to some or all of the network systems 303-305. In some examples of the present invention, the access information could be cardholder credentials. The access information could also include other information such as encryption keys that permit the cardholder to encrypt and decrypt data provided over the network 103. To provide further security, the network 103 could use public keys that digitally sign and encrypt data to ensure confidentiality, access control, data integrity, authentication, and non-repudiation. For example, using the public keys, data could be encrypted before being sent to another user or stored for future reference. The private key information could be used to access the public keys to permit the user to encrypt and decrypt data on the network 103. Some examples of the access card 306 include without limitation a card that includes a microprocessor and memory such as a smart card, and/or a card with a magnetic strip, bar code, or optical disk. Those skilled in the art will appreciate that the access card 306 could also be used to provide additional functionality as a matter of design choice.

The network access card system 307 could be any system configured to interface with the resource directory system 302 to obtain an individual user's profile information and configure a network access card 306. The network access card 306 is configured with the access information according to the level of access granted the user in the user's profile information.

The physical security system could be a conventional system that provides physical access security both internally and externally to buildings and other structures. The physical security system could utilize wireline or wireless technology to interface with the network 103. The physical security system could also receive the access information entirely from the access card 306 or in part from the access card 306 and in part via user entry. The workstation 304 could be a conventional workstation and could also utilize wireline or wireless technology to interface with the network 103. The workstation 304 could also receive the access information entirely from the access card 306 or in part from the access card 306 and in part via user entry. The network server 305 could be a conventional network server and could also utilize wireline or wireless technology to interface with the network 103. The network server 305 could also receive the access information entirely from the access card 306 or in part from the access card 306 and in part via user entry.

Figure 4:
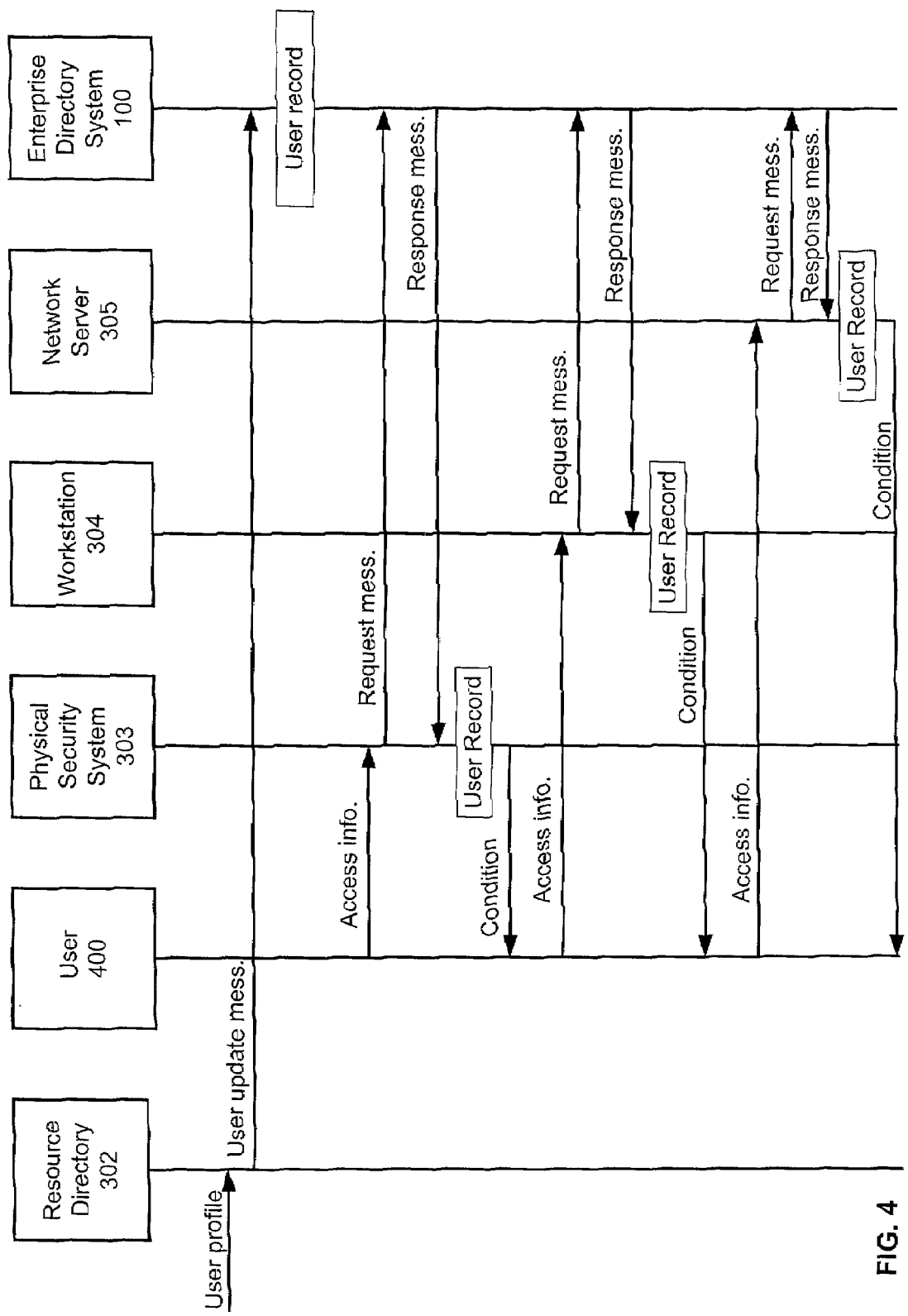
FIGS. 4 and 5 are a message sequence chart illustrating some examples of the operation of a network security system according to the present invention.
Figure 5:
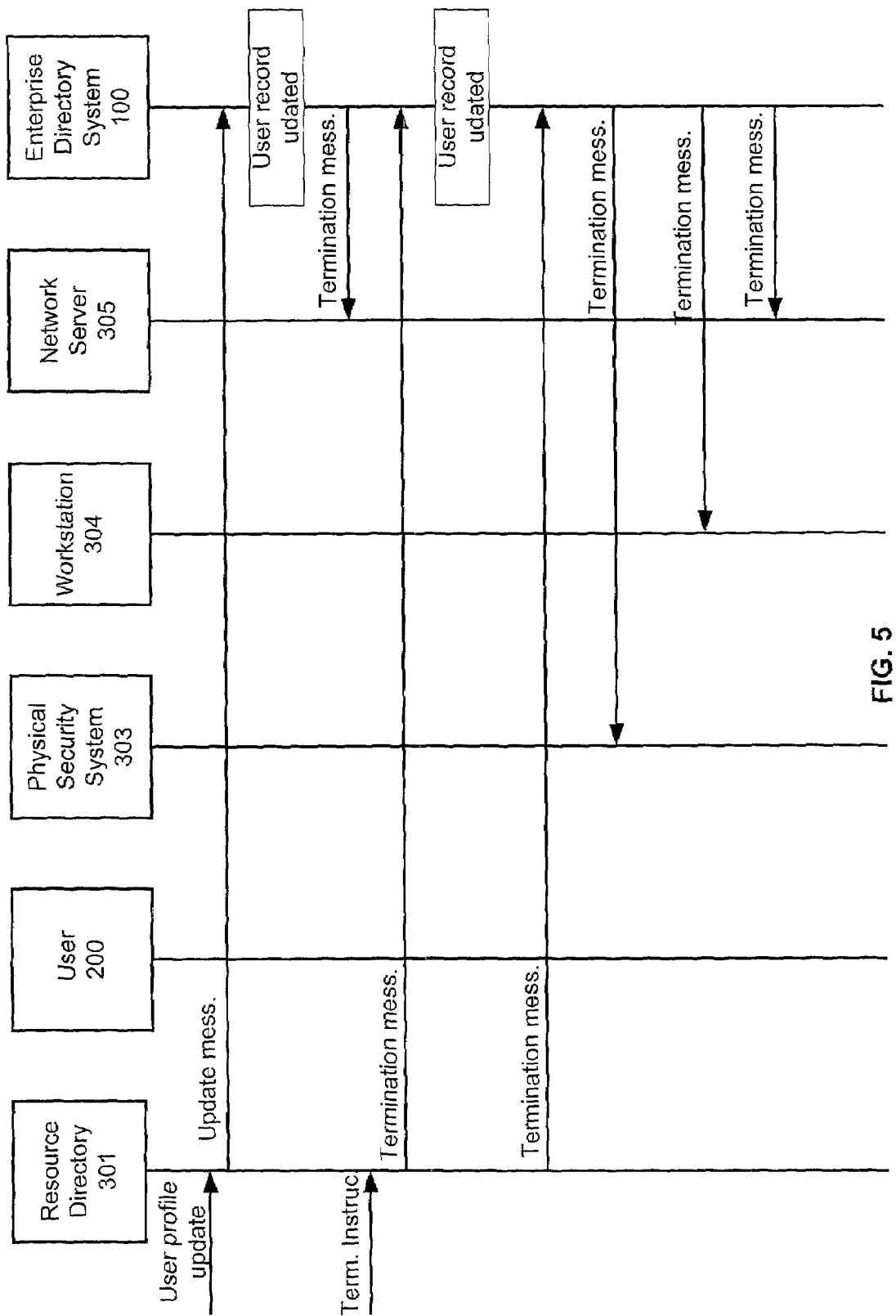

Operation FIGS. 4 and 5:

FIGS. 4 and 5 are a message sequence chart illustrating some additional examples of the operation of an enterprise directory system 100 according to the present invention. Those skilled in the art will also appreciate that various features described below could be combined with the above described embodiment to form multiple variations of the invention.

In a first example illustrated by FIG. 4, a user profile that includes access rights for a new user 400 for the various network systems, e.g. the physical security 303, the workstation 304, is setup on the resource directory 302 is received. The resource directory 302 processes the user profile information to automatically provide an update message to the enterprise directory system 100. The update message includes the access rights to the various network systems, e.g. 303-305, for the new user 400. The enterprise directory system 100 processes the update message to generate a record for the new user 400 that includes the access rights for the new user 400.

Subsequent to setup of the access rights, the user 400 may then access the various network systems, e.g. 303-305 according to the level of access provided by the access rights granted to the user 400. Continuing with the example on FIG. 4, the user 400 could use the access card 306 to provide access information to the physical security system 303 for building access. In some examples of the present invention, the access information could include a password or user identification number provided along with the access information from the access card 306. In response to receiving the access information, the physical security system 303 generates a request message for the enterprise directory system 100 that includes a request for access rights to the physical security system 303 for the user 400. In response to receiving the request message, the enterprise directory system 100 processes the request message to access the record for the user 400 and generate a response message for the physical security system 303. The response message includes the access rights for the user 400 to the physical security system 303. In response to receiving the response message, the physical security system 303 processes the response message to grant or deny access to the physical security system 303 according to the access rights for the user 400. If access is granted, the physical security system 303 could process the access rights information to create a record for the user 400 that is used to provide future access to the physical security system 303 for the user 400. Advantageously, the enterprise directory system 100 is queried only once for an initial setup of access to the physical security system 303. Future access to the physical security system 303 is internally processed using the user record in the physical security system 303 to provide the user 400 with continued access. In response to granting or denying access to the user 400, the physical security system 303 indicates the access condition to the user 400. As with the above examples, the condition could be indicated by a variety of methods as a matter of design choice and individual type of network system.

Continuing with the example of FIG. 4, the user 400 could also use the access card 306 to provide access information to the workstation 304. As with the above example, the access information could include a password or user identification number provided along with the access information from the access card 306. In response to receiving the access information, the workstation 304 generates a request message for the enterprise directory system 100 that includes a request for access rights to the workstation 304 for the user 400. In response to receiving the request message, the enterprise directory system 100 processes the request message to access the record for the user 400 and generate a response message for the workstation 304. The response message includes the access rights for the user 400 to the workstation 304. In response to receiving the response message, the workstation 304 processes the response message to grant or deny access to the workstation 304 according to the access rights for the user 400. As with the above example, if access is granted, the workstation 304 could process the access rights information to create a record for the user 400 that is used to provide future access to the workstation 304 for the user 400. In response to granting or denying access to the user 400, the workstation 304 indicates the access condition to the user 400. As with the above examples, the condition could be indicated by a variety of methods as a matter of design choice and individual type of network system.

Continuing on FIG. 4, the user 400 could also use the access card 306 to provide access information to the network server 305. In some examples of the present invention, the access information could include a password or user identification number provided along with the access information from the access card 306. In response to receiving the access information, the network server 305 generates a request message for the enterprise directory system 100 that includes a request for access rights to the network server 305 for the user 400. In response to receiving the request message, the enterprise directory system 100 processes the request message to access the record for the user 400 and generate a response message for the network server 305. The response message includes the access rights for the user 400 to the network server 305. In response to receiving the response message, the network server 305 processes the response message to grant or deny access to the network server 305 according to the access rights for the user 400. As with the above examples, if access is granted, the network server 305 could process the access rights information to create a record for the user 400 that is used to provide future access to the network server 305 for the user 400. In response to granting or denying access to the user 400, the network server 305 indicates the access condition to the user 400. As with the above examples, the condition could be indicated by a variety of methods as a matter of design choice and individual type of network system.

FIG. 5 illustrates another example of the present invention where the user 400 loses access rights to the network server 305. The operation begins when the resource directory 302 receives an update to the user profile for the user 400. The update could be received by the resource directory 302 from a system administrator or could be received from another device connected to network 103, such as a workstation used by the system administrator. In response to receiving the update information, the resource directory 302 automatically generates an update message for the enterprise directory system 100 that includes a new set of access rights for the user 400. The new set of access rights does not include access to the network server 305. In response to receiving the update message, the enterprise directory system 100 processes the update message to update the user record to include the new set of access rights. The enterprise directory system 100 also generates a termination message for the network server 305 according to the new set of access rights to terminate access to the network server 305 for the user 400.

In another example illustrated by FIG. 5, the user 400 loses all access rights to all of the network systems, e.g. 303-305. The operation begins when the resource directory 302 receives a termination instruction. As with the above example, the termination instruction could be received from various sources as a matter of design choice. In response to the termination instruction, the resource directory 302 generates a termination message for the enterprise directory system 100 that includes an instruction to terminate access to all of the network systems, e.g. 303-305, for the user 400.

In response to receiving the termination message, the enterprise directory system 100 processes the termination message to generate a termination message for the physical security system 303 and the workstation 304. It should be noted that this example is a continuation of the above example, and thus, access to the network server 305 is already terminated. In response to receiving the termination message from the enterprise directory system 100, the physical security system 303, processes the termination message to terminate access for the user 400 to the physical security system 303. In response to receiving the termination message from the enterprise directory system 100, the workstation 305 processes the termination message to terminate access for the user 400 to the workstation 305.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

We claim:

1. An enterprise directory system configured to manage security access for a plurality of users to a plurality of different network systems connected to a network, the enterprise directory system comprising:

a processing system configured to process an individual request message from each of the plurality of different network systems to generate an individual response message for each of the plurality of different network systems that includes access rights for one of the plurality of users, and process a single termination message to generate individual termination messages for each of the plurality of different network systems that includes an instruction to terminate the access rights for the one of the plurality of users; and an interface system coupled to the processing system and configured to receive the individual request messages from each of the plurality of different network systems, receive the single termination message, transmit the individual response messages to each of the plurality of different network systems, and transmit the individual termination messages to each of the plurality of different network systems for the processing system.

2. The system of claim 1 wherein the processing system is configured to process a first request message that includes a request for first access rights to a first one of the plurality of different network systems to generate a first response message that includes the first access rights, process a second request message that includes a request for second access rights to a second one of the plurality of different network systems to generate a second response message that includes the second access rights, and process the single termination message to generate the individual termination message for the first one of the plurality of different network systems and the second one of the plurality of different network systems.

3. The system of claim 2 wherein the interface system is configured to receive the first request message and the second request message for the processing system.

4. The system of claim 3 wherein the processing system is configured to process a user update message that includes access information for a new user to create a user record for the new user that includes access rights for the new user.

5. The system of claim 4 wherein the processing system is configured to process another user update message that includes new access information for the one of the plurality of users to update an existing user record for the one of the plurality of users.

6. The system of claim 5 wherein the processing system is configured to process the another update message to generate at least one termination message for at least one of the plurality of different network systems.

7. The system of claim 5 wherein the processing system is configured to utilize the user record to process the individual request messages from each of the plurality of different network systems to generate the individual response messages for each of the plurality of different network systems.

8. The system of claim 5 wherein the individual request messages from each of the plurality of different network systems are generated in response to receiving access information provided by an access card.

9. The system of claim 8 wherein the individual request messages from each of the plurality of different network systems includes a user identification number provided by one of the plurality of users with the access information.

10. The system of claim 8 wherein the individual request message from each of the plurality of different network systems includes a password provided by one of the plurality of users with the access information.

11. The system of claim 8 wherein the access information is machine readable access information.

12. The system of claim 8 wherein the number of the plurality of users is greater than one hundred.

13. The system of claim 8 wherein the number of the plurality of users is greater than one thousand.

14. The system of claim 8 wherein the number of the plurality of different network systems is greater than fifty.

15. The system of claim 8 wherein the number of the plurality of different network systems is greater than one hundred.

16. The system of claim 8 wherein access rights for the one of the plurality of users includes an instruction to permit access for the one of the plurality of users.

17. The system of claim 8 wherein the access rights for the one of the plurality of users includes an instruction to deny access for the one of the plurality of users.

18. A network security system comprising:
   an enterprise directory system configured to process a request message from each of a plurality of different network systems that includes a request for access rights for one of a plurality of users, to generate a response message for each of the plurality of different network systems that includes the access rights, and process a single termination message to generate an individual termination message for each of the plurality of different network systems that includes an instruction to terminate the access rights for the one of the plurality of users;
   a resource directory configured to receive an instruction to terminate the access rights for the one of the plurality of users and process the instruction to generate the single termination message for the enterprise directory system; and
   a network access card system configured to interface with the resource directory to configure a network access card for each of the plurality of users, wherein the network access card for each of the plurality of users includes access information for the plurality of different network systems.

19. The system of claim 18 wherein the access information is machine readable access information.

20. The system of claim 18 wherein a first one of the plurality of different network systems is configured to receive the access information and process the access information to generate a first request message that includes a request for first access rights to the first one of the plurality of different network systems and a second one of the plurality of different network systems is configured to receive the access information and process the access information to generate a second request message that includes a request for second access rights to the second one of the plurality of different network systems.

21. The system of claim 20 wherein the enterprise directory system is configured to receive and process the first request message to generate a first response message that includes the first access rights, receive and process the second request message to generate a second response message that includes the second access rights, and receive and process the single termination message to generate the individual termination message for the first one of the plurality of different network systems and the second one of the plurality of different network systems.

22. The system of claim 20 wherein the resource directory is configured to receive a user profile for a new user and process the user profile to generate a user update message that includes access information for the new user and the enterprise directory system is configured to receive and process the user update message to generate a user record for the new user that includes the new user's access rights.

23. The system of claim 22 wherein the enterprise directory system is configured to utilize the user record to process the individual request messages from each of the plurality of different network systems to generate the individual response messages for each of the plurality of different network systems.

24. The system of claim 20 wherein the resource directory is configured to receive update information for an existing user's profile and process the update information to generate another user update message that includes the update information, and the enterprise directory system is configured to receive and process the another update message to update the existing user's record.

25. The system of claim 24 wherein the enterprise directory system is configured to receive and process the another update message to generate at least one of the individual termination messages for at least one of the plurality of different network systems.

26. The system of claim 24 wherein each of the plurality of different network systems is configured to receive a user identification number along with the access information from the access card and provide the user identification number in the request message.

27. The system of claim 24 wherein each of the plurality of different network systems is configured to receive a password along with the access information from the access card and provide the password in the request message.

28. The system of claim 18 wherein the number of the plurality of users is greater than one hundred.

29. The system of claim 18 wherein the number of the plurality of users is greater than one thousand.

30. The system of claim 18 wherein the number of the plurality of different network systems is greater than fifty.

31. The system of claim 18 wherein the number of the plurality of different network systems is greater than one hundred.

32. A method of operating an enterprise directory system configured to manage security access for a plurality of users to a plurality of different network systems connected to a network, the method comprising:
    receiving individual request messages from each of the plurality of different network systems;
    processing the individual request messages to generate an individual response message for each of the plurality of different network systems that includes access rights for one of the plurality of users;
    receiving a single termination message; and
    processing the single termination message to generate an individual termination message for each of the plurality of different network systems that includes an instruction to terminate the access rights for the one of the plurality of users.

33. The method of claim 32 the method further comprising:
    receiving a first request message that includes a request for first access rights to a first one of the plurality of different network systems;
    processing the first request message to generate a first response message that includes the first access rights;
    receiving a second request message that includes a request for second access rights to a second one of the plurality of different network systems;
    processing the second request message to generate a second response message that includes the second access rights; and
    processing the single termination message to generate the individual termination message for the first one of the plurality of different network systems and the second one of the plurality of different network systems.

34. The method of claim 33 the method further comprising:
    receiving a user update message that includes access information for a new user; and
    processing the user update message to generate a user record for the new user that includes access rights for the new user.

35. The method of claim 34 the method further comprising:
    receiving another user update message that includes new access information for the one of the plurality of users; and
    processing the another user update message to update an existing user record for the one of the plurality of users.

36. The method of claim 35 the method further comprising:
    processing the another user update message to generate at least one termination message for at least one of the plurality of different network systems that includes the instruction to terminate the access rights of one of the plurality of users.

37. The method of claim 35 the method further comprising:
    using the user record to process the individual request messages from each of the plurality of different network systems to generate the individual response messages for each of the plurality of different network systems.

38. The method of claim 35 wherein the individual request messages from each of the plurality of different network systems are generated in response to receiving access information provided by an access card.

39. The method of claim 38 wherein the individual request messages from each of the plurality of different network systems includes a user identification number provided by one of the plurality of users with the access information.

40. The method of claim 38 wherein the individual request message from each of the plurality of different network systems includes a password provided by one of the plurality of users with the access information.

41. The method of claim 38 wherein the access information is machine readable access information.

42. The method of claim 38 wherein the number of the plurality of users is greater than one hundred.

43. The method of claim 38 wherein the number of the plurality of users is greater than one thousand.

44. The method of claim 38 wherein the number of the plurality of different network systems is greater than fifty.

45. The method of claim 38 wherein the number of the plurality of different network systems is greater than one hundred.

46. The method of claim 38 wherein access rights for the one of the plurality of users includes an instruction to permit access for the one of the plurality of users.

47. The method of claim 38 wherein the access rights for the one of the plurality of users includes an instruction to deny access for the one of the plurality of users.

48. A software product comprising:
    processing system instructions operational when executed on a processor to process an individual request message from each of a plurality of different network systems to generate an individual response message for each of the plurality of different network systems that includes access rights for one of a plurality of users, and process a single termination message to generate an individual termination message for each of the plurality of different network systems that includes an instruction to terminate the access rights for the one of the plurality of users;
    interface system instructions operational when executed on the processor to receive the individual request messages from each of the plurality of different network systems, receive the single termination message, transmit the individual response messages to each of the plurality of different network systems, and transmit the individual termination messages to each of the plurality of different network systems for the processing system; and
    a software storage medium operational to store the processing system instructions and the interface system instructions.

49. The product of claim 48 wherein the processing system instructions are further operational when executed on the processor to process a first request message that includes a request for first access rights to a first one of the plurality of different network systems to generate a first response message that includes the first access rights, process a second request message that includes a request for second access rights to a second one of the plurality of different network systems to generate a second response message that includes the second access rights, and process the single termination message to generate the individual termination message for the first one of the plurality of different network systems and the second one of the plurality of different network systems.

50. The product of claim 49 wherein the interface system instructions are further operational when executed on the processor to receive the first request message and the second request message for the processing system.

51. The product of claim 50 wherein the processing system instructions are further operational when executed on the processor to process a user update message that includes access information for a new user to generate a user record for the new user that includes access rights for the new user.

52. The product of claim 51 wherein the processing system instructions are further operational when executed on the processor to process another user update message that includes new access information for the one of the plurality of users to update an existing user record for the one of the plurality of users.

53. The product of claim 52 wherein the processing system instructions are further operational when executed on the processor to process the another update message to generate at least one termination message for at least one of the plurality of different network systems.

54. The product of claim 52 wherein the processing system instructions are further operational when executed on the processor to utilize the user record to process the individual request messages from each of the plurality of different network systems to generate the individual response messages for each of the plurality of different network systems.

55. The product of claim 52 wherein the individual request messages from each of the plurality of different network systems are generated in response to receiving access information provided by an access card.

56. The product of claim 55 wherein the individual request messages from each of the plurality of different network systems includes a user identification number provided by one of the plurality of users with the access information.

57. The product of claim 55 wherein the individual request message from each of the plurality of different network systems includes a password provided by one of the plurality of users with the access information.

58. The product of claim 55 wherein the access information is machine readable access information.

59. The product of claim 55 wherein the number of the plurality of users is greater than one hundred.

60. The product of claim 55 wherein the number of the plurality of users is greater than one thousand.

61. The product of claim 55 wherein the number of the plurality of different network systems is greater than fifty.

62. The product of claim 55 wherein the number of the plurality of different network systems is greater than one hundred.

63. The product of claim 55 wherein access rights for the one of the plurality of users includes an instruction to permit access for the one of the plurality of users.

64. The product of claim 55 wherein the access rights for the one of the plurality of users includes an instruction to deny access for the one of the plurality of users.

* * * * *